United States Patent Office 2,854,575
Patented Sept. 30, 1958

2,854,575

ELECTRONIC SWEEP GENERATING CIRCUIT WITH CONSTANT MAGNITUDE OF SWEEP

Henry Arnold Richardson, Stretford, England, assignor to Metropolitan-Vickers Electrical Company Limited, London, England, a company of Great Britain Application September 21, 1954, Serial No. 457,438

Claims priority, application Great Britain September 29, 1953

7 Claims. (Cl. 250—27)

This invention relates to electronic sweep generating circuits, and has an important application in recurrent voltage or current sweep circuits for providing a time base deflection in cathode ray tube display apparatus.

In many cases in which a cathode ray tube is employed to display information such as a waveform or signals against a time base there is a liability that the recurrence frequency of the information displayed may vary. This, of course, will cause length of the display along the time base axis to vary. In many cases such variation cannot be tolerated, for example, in some cases it may be necessary for certain parts of the waveform of the information to coincide with markings on the glass screen or to coincide with apertures in a mask and variation in the frequency of the signals without compensating the time base may displace the signals to such an extent as to render such uses impracticable.

According to the present invention means are provided whereby the peak values of a recurrent voltage sweep are applied to a smoothing or memory circuit and the output is applied to a comparator circuit having means whereby the error voltage controls the rate of charging of the time base condenser.

According to the present invention an electric circuit arrangement for generating recurring voltage sweeps is provided with means whereby the peak values of recurrent voltage sweeps are applied to a smoothing or memory circuit and the output is applied to a comparator circuit in which the amplitude of the voltage sweeps is compared with a reference voltage together with means whereby the error voltage obtained from the comparator circuit is applied to the sweep generator circuit so as to tend to maintain the sweep amplitude at a required value.

In arrangements in which the voltage sweeps are developed across a time base condenser the error voltage from the comparator may control the rate of charging of the condenser. In arrangements in which the condenser is charged through a resistance the error voltage or a voltage representative thereof may be applied to the end of the resistance remote from the condenser.

It will be appreciated that whilst the invention is mainly concerned with recurrent sweep voltage circuits the voltage sweeps so generated may be employed to generate current sweeps.

In order that the invention may be more clearly understood reference will now be made to the accompanying drawings, in which.

Figure 1:
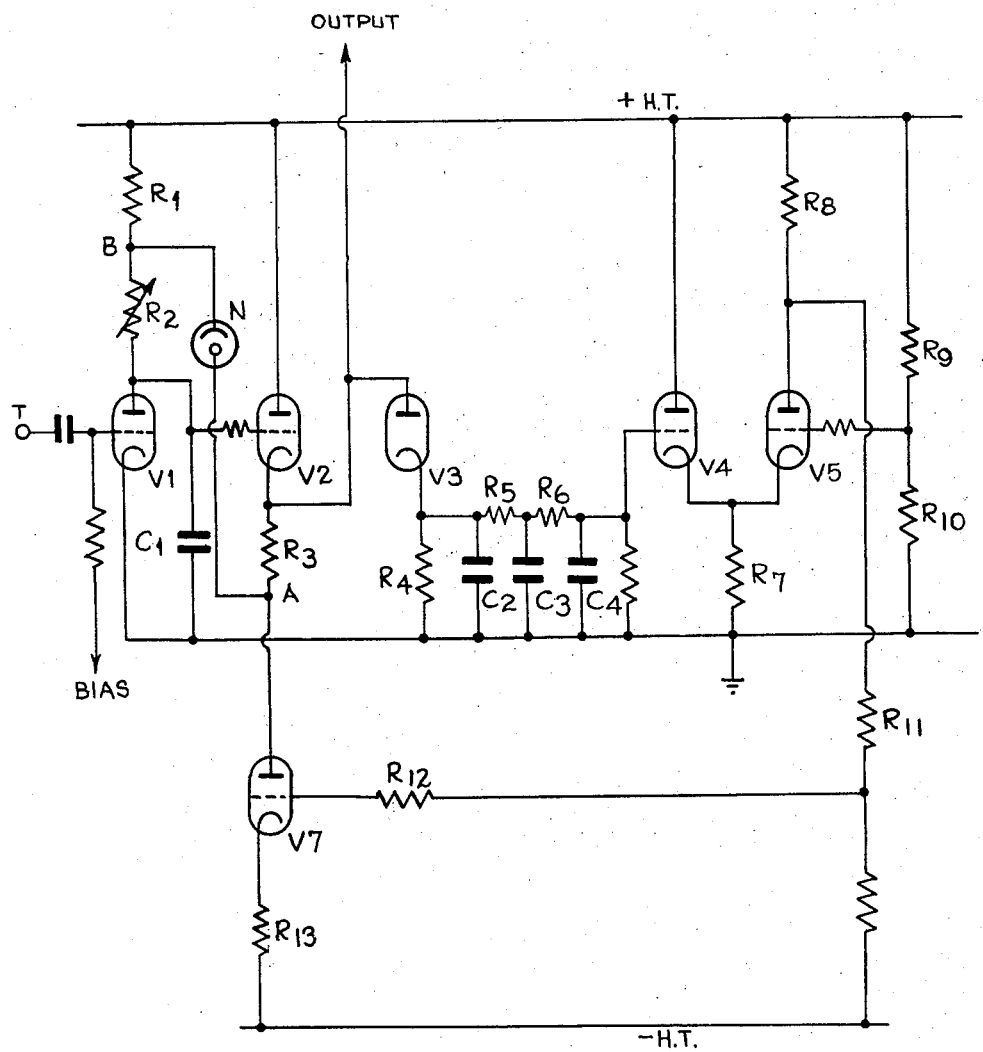
Fig. 1 shows a voltage sweep circuit in accordance with the invention applied to a so-called "Bootstrap" time base re-arranged so as to be suitable for very slow sweep rates.

Referring to Fig. 1, in the arrangement shown the sweep voltage is developed across condenser C1 which is charged through resistance R2 and periodically discharged through the valve V1 by tripping pulses applied to the terminal T. The voltage developed across C1 is fed to an output through a cathode follower valve V2. Linearising is effected by feedback from the negative end of cathode resistance R3 through the coupling neon tube N to the junction point of R1 and R2.

The invention consists in controlling the rate of charge of the condenser C1 so that the value attained at the end of each sweep remains substantially constant despite any change in recurrence frequency of the tripping pulses applied to terminal T. This control is effected by applying the sweep voltages through a diode rectifier V3 so that the peak values are applied to a smoothing circuit constituted by the resistors R4, R5 and R6 and condensers C2, C3 and C4. The smoothed peak voltages are then applied to the grid of the valve V4. The valves V4 and V5 constitute a comparator circuit and are cathode coupled through the common resistor R7. The valve V5 has an anode resistor R8, and its grid is coupled to the junction point of the potential divider circuit R9 and R10 which constitutes a point of reference voltage. The circuit is so arranged that if the voltage applied to the grid of V4 departs from the desired value, then a voltage is developed at the anode of V5 which is applied through resistors R11 and R12 to the grid of V7. V7 is connected between the negative end of the resistor R3 and a point of high negative potential referred to as —HT through a cathode resistor R13.

It will be appreciated that variations in the voltage fed to the grid of V7 from the comparator circuit will vary the voltage at the point A and since the voltage across the neon will remain practically constant, the point B will follow variations in the voltage at A. Thus the voltage between the point B and the top of condenser C1 will vary and control the rate of charging of the condenser C1 in such a manner that the peak voltage at the end of the sweep tends to remain constant.

It will be readily appreciated that in the case of a cathode ray tube time base sweep this will maintain the display at a fixed position on the tube screen.

Figure 2:
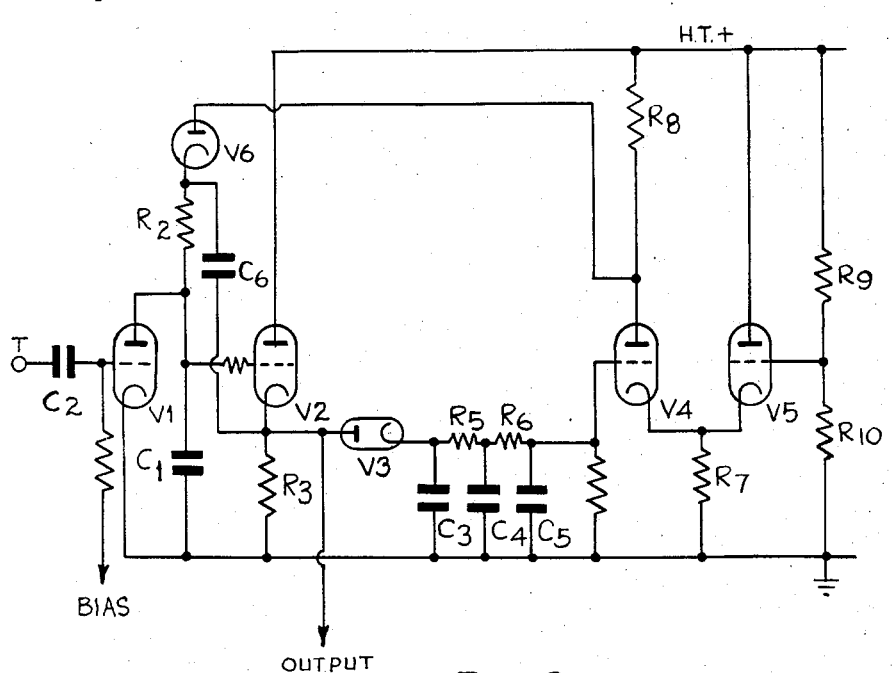
Fig. 2 shows the invention applied to a normal "Bootstrap" time base.

Fig. 2 shows the invention applied to the so-called "Bootstrap" circuit in which the linearising feed back is from the cathode of V2 to the upper end of V6, via C6, the neon tube N of Fig. 1 being omitted. In applying the invention the resistance R1 is also omitted and the upper end of R2 is connected through a diode V6 to the anode of V4.

The charging circuit for C1 is now from HT+ through R8, V6 and R2 to the upper plate of C1. Clearly with this arrangement the voltage applied to the time base condenser will be controlled by the anode voltage of V4.

Figure 3:
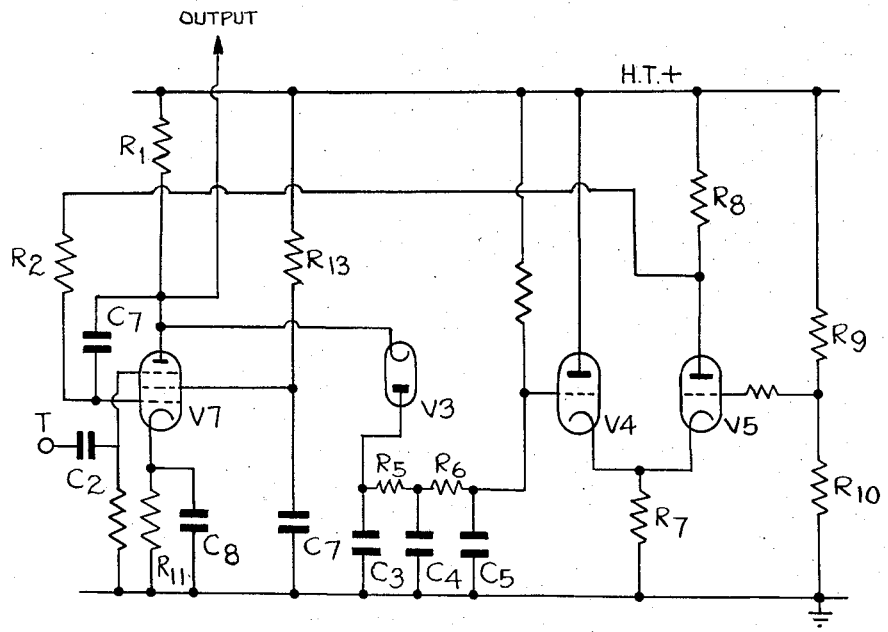
Fig. 3 shows the invention applied to a so-called "Miller" type time base.

Fig. 3 shows the invention applied to a so-called "Miller" time base, in which a pentode valve V7 has a capacity coupling C7 between its anode and control grid, so that it generates falling voltage sweeps at the anode when triggered by tripping pulses applied to the terminal T.

In this case the control voltage is applied from the anode of V5 through resistor R2 to the control grid of V7. V7 is shown with the normal cathode and screen grid connections, the cathode circuit including the resistor R11 and condenser C8 and the screen grid circuit the resistor R13 and decoupling condenser C7.

What I claim as new and desire to secure by Letters Patent of the United States is:

1. A sweep generator for generating recurring timebase sweeps comprising a condenser, trigger means for periodically changing the voltage across said condenser to produce voltage sweeps, a rectifier for passing the peaks only of said voltage sweeps, a smoothing circuit to which said peaks are applied, a comparator circuit in which the integrated output of said smoothing circuit is compared with a reference voltage to obtain an error voltage, means for feeding back said error voltage to said condenser, and means for controlling the rate of change of voltage across said condenser during the time of the sweep in accordance with said error voltage so that a predetermined magnitude of sweep is obtained irrespective of the frequency of the sweep.

2. A circuit arrangement for generating recurrent voltage sweeps comprising a condenser, a thermionic valve in parallel with said condenser, two resistors, a connection between said two resistors, means for linearly charging said condenser through said two resistors in series, means for periodically applying tripping pulses to the control grid of said valve so as to cause said valve to conduct and hence rapidly discharge said condenser, a cathode follower circuit to which said voltage sweeps are applied together with a rectifier for passing the peaks only of the sweep voltage output of the cathode follower circuit, a resistance-capacity smoothing circuit to which said peaks are applied so as to obtain an integrated output, a comparator circuit comprising two thermionic valves having a common cathode resistor and each having a control grid, means for applying the output of the smoothing circuit to the control grid of one of said valves of the comparator circuit and a reference voltage to the control grid of the other valve of the comparator circuit, means for deriving an error voltage from one of the valves of the comparator circuit which is representative of the difference between the output voltage of the smoothing circuit and the reference voltage, and means for applying said error voltage to the connection between said two resistors so as to maintain the successive peak voltages of said condenser substantially constant irrespective of variations in the periodicity of the discharge thereof.

3. A circuit arrangement for generating recurrent voltage sweeps comprising a condenser, a thermionic valve in parallel with said condenser, two resistors, a connection between said two resistors, means for linearly charging said condenser through said two resistors in series, means for periodically applying tripping pulses to the control grid of said valve so as to cause said valve to conduct and hence rapidly discharge said condenser, a cathode follower circuit having a valve to which said voltage sweeps are applied together with a rectifier for passing the peaks only of the sweep voltage output of the cathode follower circuit, a resistance-capacity smoothing circuit to which said peaks are applied so as to obtain an integrated output, a comparator circuit in which the output of said smoothing circuit is compared with a reference voltage to obtain an error voltage, a feed-back valve having an anode, cathode and control grid and connected in series with said cathode follower valve, means for applying said error voltage to the control grid of said feedback valve, and means for applying the voltage at the anode of said feed-back valve to the connection between said two resistors so as to maintain the successive peak voltages of said condenser substantially constant irrespective of variations in the periodicity thereof.

4. A circuit arrangement according to claim 3, including a neon tube connected between the anode of said feedback valve and the connection between said two resistors.

5. A circuit arrangement for generating recurrent voltage sweeps comprising a condenser, a thermionic valve in parallel with said condenser, first and second charging resistors, a connection between said two resistors and a connection between said condenser and said first charging resistor, means for linearly charging said condenser through said two resistors in series, means for periodically applying tripping pulses to the control grid of said valve so as to cause said valve to conduct and hence rapidly discharge said condenser, a cathode follower circuit to which said voltage sweeps are applied together with a rectifier for passing the peaks only of the sweep voltage output of the cathode follower circuit, a resistance-capacity smoothing circuit to which said peaks are applied so as to obtain an integrated output, a comparator circuit comprising first and second thermionic valves having a common cathode resistor and each having a control grid, and means for applying the output of the smoothing circuit to the control grid of said first valve and a reference voltage to the control grid of said second valve, said first valve having an anode load formed by said second charging resistor, the arrangement being such that the voltage appearing at the connection between said two charging resistors is representative of the difference between the output voltage of the smoothing circuit and the reference voltage to thereby maintain the successive peak voltages of said condenser substantially constant irrespective of variations in the periodicity of the discharge thereof.

6. A circuit arrangement according to claim 5, including a diode valve interposed between the anode of said first comparator valve and said first charging resistor.

7. A circuit arrangement for generating recurrent voltage sweeps comprising a condenser, a thermionic valve having a cathode, anode and control grid, said condenser being connected between the anode and control grid of said valve, means for linearly charging said condenser and means for periodically discharging said condenser so as to generate recurrent voltage sweeps in said condenser, a rectifier for passing the peaks only of said voltage sweeps, a smoothing circuit to which said peaks are applied so as to obtain an integrated output, a comparator circuit in which the output of said smoothing circuit is compared with a reference voltage to obtain an error voltage, and means for applying said error voltage to the control grid of said thermionic valve so as to maintain the successive peak voltages of said condenser substantially constant irrespective of variations in the periodicity of the discharge thereof.

References Cited in the file of this patent

UNITED STATES PATENTS

| | | |
|---|---|---|
| 2,126,243 | Busse et al. | Aug. 9, 1938 |
| 2,448,070 | Sunstein | Aug. 31, 1948 |
| 2,554,172 | Custin | May 22, 1951 |
| 2,555,837 | Williams | June 5, 1951 |
| 2,562,188 | Hance | July 31, 1951 |
| 2,597,322 | Higinbotham | May 20, 1952 |
| 2,621,292 | White | Dec. 9, 1952 |
| 2,627,031 | Moore | Jan. 27, 1953 |
| 2,645,715 | Weller et al. | July 14, 1953 |